US012623580B2

(12) United States Patent
Shamanaik et al.

(10) Patent No.: US 12,623,580 B2
(45) Date of Patent: May 12, 2026

(54) EXTENDABLE COMPACT ARM REST

(71) Applicant: Volvo Truck Corporation, Gothenburg (SE)

(72) Inventors: Bharat Shamanaik, Karnataka (IN); Balaganesh Thangamariappan, Karnataka (IN); Anubhav Kumar Singh, Chhattisgarh (IN)

(73) Assignee: Volvo Truck Corporation, Gothenburg (SE)

( * ) Notice: Subject to any disclaimer, the term of this patent is extended or adjusted under 35 U.S.C. 154(b) by 172 days.

(21) Appl. No.: 18/425,099

(22) Filed: Jan. 29, 2024

(65) Prior Publication Data

US 2024/0270137 A1 Aug. 15, 2024

(30) Foreign Application Priority Data

Feb. 10, 2023 (EP) ..................................... 23156079

(51) Int. Cl.
*B60N 2/75* (2018.01)
(52) U.S. Cl.
CPC ............. *B60N 2/773* (2018.02); *B60N 2/753* (2018.02)
(58) Field of Classification Search
CPC .... A47C 1/0307; A47C 1/0308; B60N 2/753; B60N 2/773; B60N 2/267
USPC ................ 297/411.3, 411.32, 411.37, 411.38
See application file for complete search history.

(56) References Cited

U.S. PATENT DOCUMENTS

| | | | | | |
|---|---|---|---|---|---|
| 5,288,130 A | * | 2/1994 | Foster | ................ | A63B 21/4047 |
| | | | | | 482/121 |
| 5,379,663 A | * | 1/1995 | Hara | ........................ | G05G 9/04 |
| | | | | | 345/161 |
| 5,409,297 A | * | 4/1995 | De Filippo | ............ | B60N 2/757 |
| | | | | | 16/334 |
| 5,571,274 A | * | 11/1996 | Holstensson | ............ | A47C 1/03 |
| | | | | | 297/411.36 |
| 5,752,683 A | * | 5/1998 | Novis | ................... | A47C 1/0307 |
| | | | | | 248/218.1 |
| 6,217,119 B1 | * | 4/2001 | Cook | ..................... | A47C 7/543 |
| | | | | | 297/411.3 |
| 6,341,821 B1 | * | 1/2002 | Rousseau | .............. | E02F 9/2004 |
| | | | | | 297/411.44 |

(Continued)

FOREIGN PATENT DOCUMENTS

| | | | | |
|---|---|---|---|---|
| DE | 102020201014 A1 | | 7/2021 | |
| DE | 102021003915 A1 | * | 9/2021 | ............. B60N 2/067 |
| JP | 2001046174 A | * | 2/2001 | ........... A47C 1/0308 |

OTHER PUBLICATIONS

Extended European Search Report for European Patent Application No. 23156079.8, mailed Jul. 18, 2023, 7 pages.

*Primary Examiner* — Jose V Chen
(74) *Attorney, Agent, or Firm* — Withrow & Terranova, PLLC

(57) ABSTRACT

An armrest for a vehicle seat, comprising an armrest main portion, a pivotable attachment for coupling the armrest main portion to a seat backrest, such that the armrest is pivotable between a folded position and a rest position, an armrest extension movable between a retracted position and a deployed position in which the armrest extension extends the armrest main portion, and a foldable mechanism coupling the pivotable attachment to the armrest extension and configured to move the armrest extension from the retracted position to the deployed position when the armrest is moved from the folded position to the rest position.

15 Claims, 2 Drawing Sheets

(56)                    References Cited

U.S. PATENT DOCUMENTS

| | | | | | |
|---|---|---|---|---|---|
| 6,533,353 | B2 * | 3/2003 | Johnston | ................ | A61G 5/125 |
| | | | | | 297/DIG. 10 |
| 7,611,205 | B2 * | 11/2009 | Chen | ........................ | B60N 2/26 |
| | | | | | 297/250.1 |
| 7,845,732 | B2 * | 12/2010 | Liu | ........................ | B60N 2/767 |
| | | | | | 297/411.32 |
| 7,850,244 | B2 * | 12/2010 | Salewski | ................ | B60N 2/767 |
| | | | | | 297/411.32 |
| 11,618,360 | B2 * | 4/2023 | Artus | .................... | B60N 2/787 |
| | | | | | 297/411.32 |
| 11,618,573 | B2 * | 4/2023 | Hoover | ........... | B64D 11/06395 |
| | | | | | 297/411.32 |
| 11,731,543 | B2 * | 8/2023 | Nuss | ..................... | B60N 2/943 |
| | | | | | 297/411.32 |
| 2002/0096928 | A1 * | 7/2002 | Bidare | ................... | B60N 2/767 |
| | | | | | 297/411.32 |

| | | | | | |
|---|---|---|---|---|---|
| 2004/0124687 | A1 * | 7/2004 | Nae | ........................ | B60N 2/777 |
| | | | | | 297/411.32 |
| 2004/0135419 | A1 * | 7/2004 | Kitamura | ............... | B60N 2/753 |
| | | | | | 297/411.3 |
| 2006/0273647 | A1 * | 12/2006 | Omori | .................... | B60N 2/767 |
| | | | | | 297/411.32 |
| 2009/0309407 | A1 * | 12/2009 | Saito | ..................... | A47C 7/543 |
| | | | | | 297/411.32 |
| 2012/0032489 | A1 * | 2/2012 | Kladde | .................. | B60N 2/505 |
| | | | | | 297/411.38 |
| 2014/0183923 | A1 * | 7/2014 | Itzinger | .................. | B64D 11/06 |
| | | | | | 297/411.38 |
| 2015/0182396 | A1 * | 7/2015 | Derks | .................. | A61G 5/1043 |
| | | | | | 297/411.37 |
| 2017/0071345 | A1 * | 3/2017 | Tsai | ........................ | A47C 1/03 |
| 2023/0091680 | A1 * | 3/2023 | Lee | ........................ | B60N 2/773 |
| | | | | | 297/411.32 |

* cited by examiner

13a

13

21

31'

15'

14'

15'

19

EXTENDABLE COMPACT ARM REST

PRIORITY APPLICATIONS

The present application claims priority to European Patent Application No. 23156079.8, filed on Feb. 10, 2023, and entitled "EXTENDABLE COMPACT ARM REST," which is incorporated herein by reference in its entirety.

TECHNICAL FIELD

The disclosure relates generally to seats of vehicles, such as motor vehicles. In particular aspects, the disclosure relates to an arm rest for a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

Prior art discloses armrest assemblies for seat structures, having a fixed length which results in packaging constraints. As having a fixed length, such armrests cannot be adapted to different anatomical proportions of the users. Some armrests are pivotably coupled to back rest of a seat structure, such that they need to be manually folded when not in use. Other armrests comprise a primary armrest pivotably coupled to back rest of the seat structure and a foldable armrest extension located in the primary armrest. The armrest extension needs to be manually deployed to be used and folded when not in use and when the primary armrest is put in its folded position. Other existing armrests are fixed in size which results in packaging constraints and limit the offerings to various customers with a single arm rest type.

There is a need to provide an armrest that is compact, especially when it is not in use, and that is easy to be set up to be used. Further it may be a desirable for the armrest to be easily folded when not in-use.

SUMMARY

The present disclosure is related to an armrest for a vehicle seat, comprising: an armrest main portion, a pivotable attachment for coupling the armrest main portion to a seat backrest, such that the armrest is pivotable between a folded position and a rest position, an armrest extension movable between a retracted position and a deployed position in which the armrest extension extends the armrest main portion, and a foldable mechanism coupling the pivotable attachment to the armrest extension and configured to move the armrest extension from the retracted position to the deployed position when the armrest is moved from the folded position to the rest position.

A potential technical benefit may include: as having an extension in a retracted position in a folded position, the armrest can be compact and thus adapted to different kinds of vehicles. The presence of such an extension does not require additional manual operations for setting up the armrest in its in-use position. This result can be obtained merely by using simple mechanical means and without increasing the bulkiness of the armrest.

According to an example, the foldable mechanism is further configured to move the armrest extension from the deployed position to the retracted position when the armrest is moved from the rest position to the folded position.

A potential technical benefit may include: the presence of such an extension does not require additional manual operations for setting up the armrest in its folded position. This result can be obtained merely by using simple mechanical means and without increasing the bulkiness of the armrest.

According to an example, the foldable mechanism is further configured to convert a rotational movement of the pivotable attachment into a translational movement of the armrest extension.

According to an example, at least one of the armrest main portion and the armrest extension has a hollow body.

According to an example, the armrest extension is slidingly guided in or along the armrest main portion between the retracted and deployed positions.

According to an example, the armrest extension is housed in the armrest main portion in the retracted position.

A potential technical benefit may include: such an armrest extension does not increase the bulkiness of the armrest both in the folded and in-use positions.

According to an example, the foldable mechanism comprises a transmission mechanism transmitting to a first pinion a rotation of the pivotable attachment with respect to the armrest main portion, the pinion being rotatable secured to the armrest main portion and meshing with a rack secured to the armrest extension.

A potential technical benefit may include: such a transmission mechanism can be easily implemented in a reduced volume that does not need to increase the bulkiness of the armrest.

According to an example, the transmission mechanism between the pivotable attachment and the first pinion comprises: a transmission belt transmitting a rotation movement of a first pulley to a second pulley, or a transmission chain transmitting a rotation movement of a first pinion to a second pinion.

A potential technical benefit may include: such transmission mechanism implementations can be realized in a reduced volume that does not increase the bulkiness of the armrest.

According to an example, a diameter of the first pulley is adjusted as a function of an extension course between the retracted position and the deployed position, that is needed for the armrest extension and a rotation angle of the armrest between the folded position and the in-use position.

A potential technical benefit may include: such an armrest can be easily adjusted to various vehicle cockpit configurations.

According to an example, the armrest further comprises a spring pre-loaded mechanism configured to bring the armrest to its folded position when activated.

A potential technical benefit may include: almost no manual effort can be required to set the armrest in its folded position.

According to an example, the spring pre-loaded mechanism is configured to be activated by a small push on the armrest.

A potential technical benefit may include: almost no manual effort is required to set the armrest in its folded position.

According to an example, the spring pre-loaded mechanism comprises: a torsional spring pre-loaded mechanism at the pivotable attachment, or a gas strut which is compressed in the retracted position of the armrest extension and expanded in the deployed position of the armrest extension.

A potential technical benefit may include: such a spring pre-loaded mechanism can be implemented in a very compact way.

According to an example, the pivotable attachment is configured to adjust an angle of the armrest in the in-use position with respect to the horizontal direction.

A potential technical benefit may include: the armrest can be easily adapted to various vehicle cockpit configurations and various positions of the user in the vehicle cockpit.

Another aspect of the disclosure may be related to a vehicle seat comprising a seat backrest and an armrest as above defined.

Another aspect of the disclosure may be related to a vehicle comprising such a seat.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figures 1A, 1B, 1C, 2A, 2B, 3A, 3B:
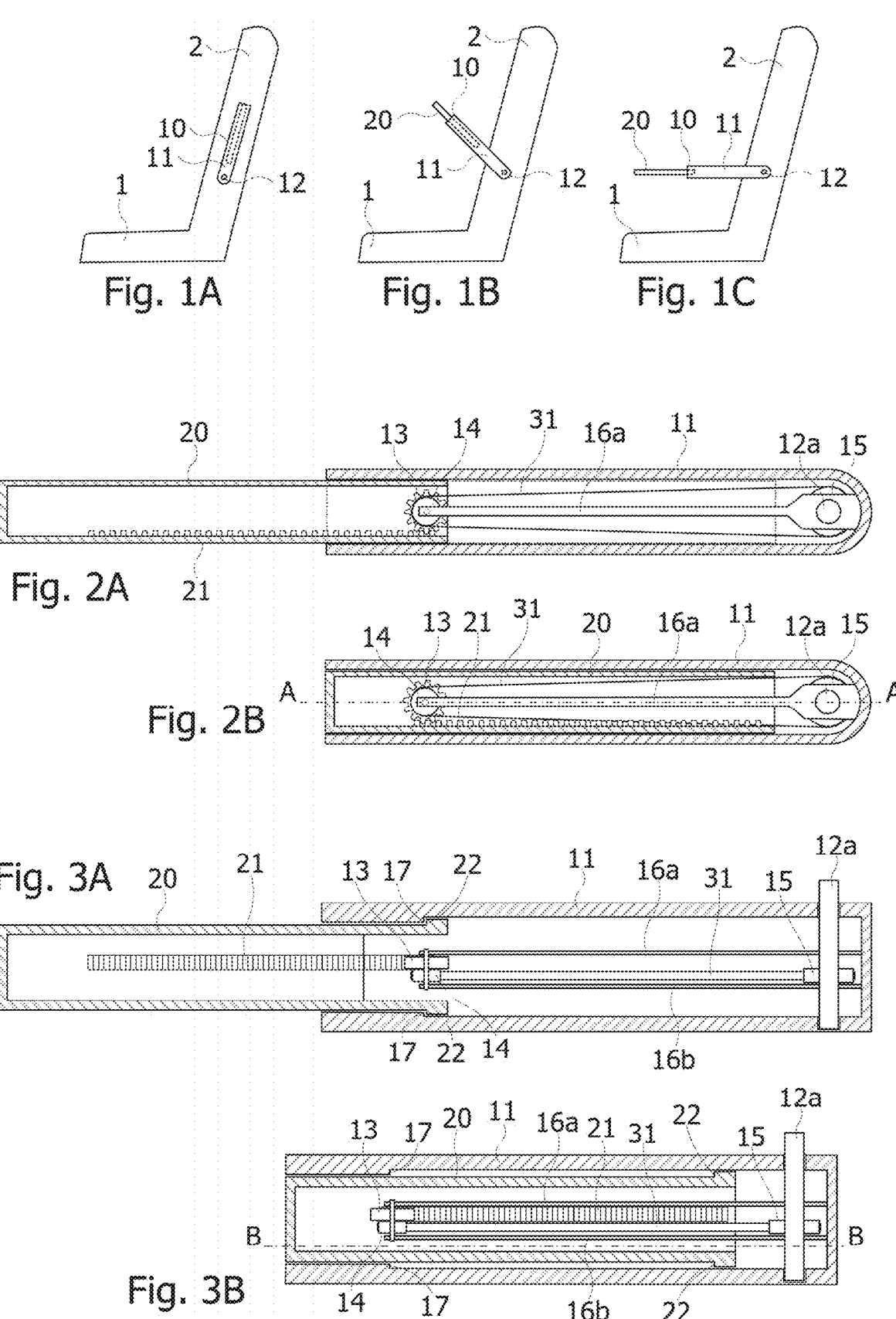
FIGS. 1A, 1B, and 1C are lateral views of a seat with an armrest in different positions, according to one example.
FIGS. 2A and 2B are cross-sectional views of the armrest according to a cross-sectional plane BB shown in FIG. 3, the armrest being shown respectively in its deployed and retracted configurations, according to one example.
FIGS. 3A and 3B are cross-sectional views of the armrest according to a cross-sectional plane AA shown in FIG. 2B, the armrest being shown respectively in its deployed and retracted configurations, according to one example.

FIGS. 1A, 1B, and 1C show a vehicle seat 1 with an armrest 10, according to one example. The armrest 10 comprises an armrest main portion 11, a pivotable attachment 12 for coupling the armrest main portion to a seat backrest 2, such that the armrest is pivotable between a folded position as shown in FIG. 1A and an in-use position as shown in FIG. 1C. The armrest 10 further comprises an armrest extension 20 movable between a retracted position as shown in FIG. 1A and a deployed position as shown in FIG. 1C, in which the armrest extension 20 extends the armrest main portion substantially axially. The armrest 10 further comprises a foldable mechanism coupling the armrest extension 20 to the pivotable attachment 12 and configured to move the armrest extension 20 from the retracted position to the deployed position when the armrest main portion 11 is moved from the folded position to the in-use position.

During the folding movement of the armrest from the folded position (FIG. 1A) to the in-use position (FIG. 1C), the foldable mechanism converts the rotational movement of the pivotable attachment 12 into a translational movement of the armrest extension 20. Thus in an intermediary position between the folded position and the in-use position, as shown in FIG. 1B, the armrest extension 20 is partially deployed in an intermediate position between the retracted position and the deployed position. In the in-use position, the armrest 10 may be substantially horizontal (to within plus or minus 10°).

Thus the armrest extension 20 does not need to be manually actuated when the armrest 10 is set in its in-use position.

According to another example, the foldable mechanism is configured to move the armrest extension 20 from the deployed position to the retracted position when the armrest main portion 11 is moved from the in-use position to the folded position. Thus the armrest extension 20 does not need to be manually actuated when the armrest 10 is set in its folded position.

FIGS. 2A, 2B, 3A, and 3B show the armrest and more particularly an example of the foldable mechanism coupling the pivotable attachment 12 to the armrest extension 20. FIGS. 2A and 3A show the armrest 10 in its in-use position and FIGS. 2B and 3B show the armrest 10 in its folded position.

The armrest main portion 11 and the armrest extension 20 both may have a hollow body. The armrest extension 20 is slidingly guided in or along the armrest main portion 11 between the retracted and deployed positions. In the deployed position, the armrest extension 20 is partially maintained in the armrest main portion 11. According to an example illustrated in FIGS. 3A and 3B, a proximal part of the armrest extension 20 comprises a transversally extending edge 22 configured to cooperate with an inner shoulder 17 formed in a distal part of the hollow body of the armrest main portion 11, when the armrest extension 20 reaches the deployed position. The edge 22 and the shoulder 17 cooperate to prevent the armrest extension 20 from being separated from the armrest main portion 11.

The foldable mechanism may comprise a transmission mechanism 14, 15, 31 transmitting the rotation of a shaft 12a forming the pivotable attachment 12 to a pinion 13. The pinion 13 is rotatably secured to the armrest main portion 11 and meshes with a rack 21 secured to an inner face of the hollow body of the armrest extension 20. The shaft 12a has a fixed angular position with respect to the seat backrest 2. Therefore, when the armrest main portion 11 is pivoted between the folded position and the in-use position, the shaft 12a rotates about its axis with respect to the armrest main portion 11. This rotation movement is transmitted to the pinion 13 which meshes with the rack 21 and thus moves the armrest extension 20 to the inside or outside of the hollow body of the armrest main portion 11.

According to an example, the pinion 13 is maintained in a distal position in the armrest main portion 11 between distal parts of arms 16a, 16b, proximal parts of arms 16a, 16b being secured to the armrest main portion 11.

Figures 4, 5, 6:
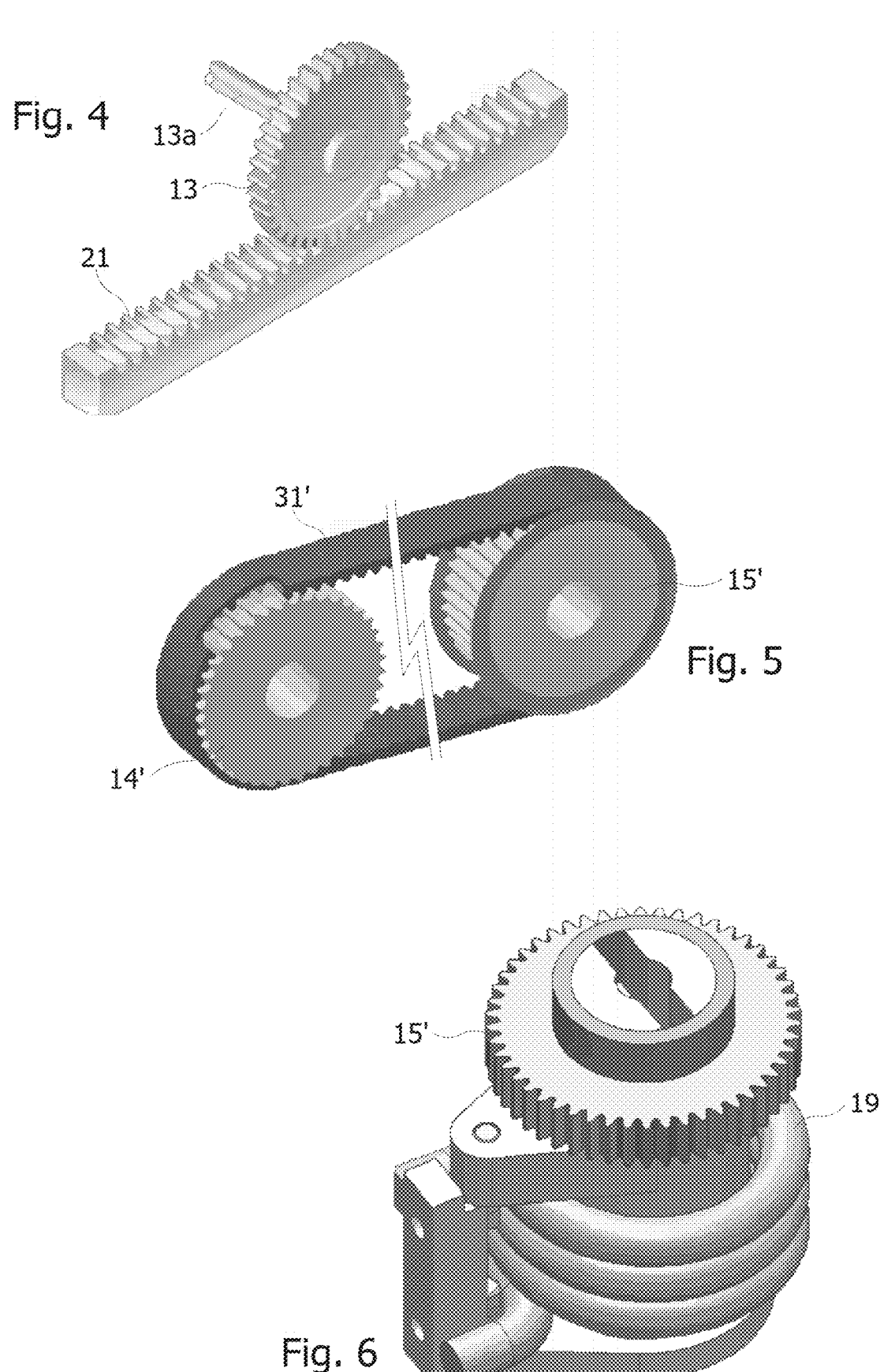
FIG. 4 is a perspective view of an example of a rack and pinion coupling.
FIG. 5 is a perspective view of an example of a belt transmission.
FIG. 6 is a perspective view of an example of a pivot gear arrangement with a torsion spring.

FIG. 4 shows the pinion 13 and the rack 21. It is apparent on FIG. 4 that a rotation of the pinion 14 about its axis 13a drives the rack 21 in translation along the longitudinal axis of the latter.

According to an example, the transmission mechanism between the shaft 12a and the pinion 13 comprises a pulley 15 axially fixed to the shaft 12a, a pulley 14 axially fixed to the pinion 13 and a transmission belt 31 circulating around the pulleys 14, 15. The diameter of the pulley 15 may be adjusted as a function of the extension course between the retracted position and the deployed position, that is needed for the armrest extension 20 and the rotation angle of the armrest main portion 11 between the folded position and the in-use position. If necessary, the dimensions of the part of the armrest main portion 11 around the pulley 15 can be extended to house a pulley of greater diameter.

According to another example shown in FIG. 5, the pulleys 14, 15 are replaced by pinions 14', 15' and the transmission belt 31 is replaced by a transmission-toothed belt 31', or a transmission chain.

According to another example, the armrest 10 further comprises a torsional spring pre-loaded mechanism at the pivot location of the shaft 12*a*, which is configured to bring the armrest to its folding position. As shown in FIG. 6, such a torsional spring pre-loaded mechanism comprises a pre-loaded torsional spring 19 which is coaxially fixed to the pulley 15 or pinion 15' (in the example of FIG. 6), such that when the pulley or pinion rotates, the spring 19 is tensioned or released depending on the rotation direction of the pulley or pinion 15'. The torsional spring pre-loaded mechanism can be configured to be activated by a small push on the armrest 10 to return from its tensioned angular position to its released angular position. In this manner, the armrest 10 can be set to its folded position very easily.

According to another example, the armrest 10 comprises a gas strut which is compressed when the armrest extension 20 is in the retracted position and expanded when the armrest extension 20 is in the deployed position.

According to an example, the armrest 10 is coupled to the seat backrest 2 by a pivotable attachment configured to adjust the angle of the armrest 10 in the in-use position with respect to the horizontal direction.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

More particularly, the foldable mechanism may be configured to only move the armrest extension 20 from the retracted position to the deployed position when the armrest 10 is manually moved from the folded position to the rest position. To fold the armrest, the user can push on the armrest extension 20 towards its retracted position and push the armrest main portion 11 to its folded position.

In addition, other foldable mechanisms can be easily conceived by the skilled person to couple the deploying movement of the armrest extension 20 from the retracted position to the deployed position to the armrest pivoting movement from the folded position to the rest position, or reversely.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

The invention claimed is:

1. An armrest for a vehicle seat, comprising:
   an armrest main portion;
   a pivotable attachment for coupling the armrest main portion to a seat backrest, such that the armrest is pivotable between a folded position and a rest position;
   an armrest extension movable between a retracted position and a deployed position in which the armrest extension extends the armrest main portion; and
   a foldable mechanism coupling the pivotable attachment to the armrest extension and configured to move the armrest extension from the retracted position to the deployed position as the armrest is moved from the folded position to the rest position.

2. The armrest of claim 1, wherein the foldable mechanism is further configured to move the armrest extension from the deployed position to the retracted position when the armrest is moved from the rest position to the folded position.

3. The armrest of claim 1, wherein the foldable mechanism comprises a rack and a pinion to convert a rotational movement of the pivotable attachment into a translational movement of the armrest extension.

4. The armrest of claim 1, wherein the armrest extension is housed in the armrest main portion in the retracted position.

5. The armrest of claim 1, wherein at least one of the armrest main portion and the armrest extension has a hollow body.

6. The armrest of claim 1, wherein the armrest extension is slidingly guided in or along the armrest main portion between the retracted and deployed positions.

7. The armrest of claim 1, wherein the foldable mechanism comprises a transmission mechanism transmitting to a first pinion a rotation of the pivotable attachment with respect to the armrest main portion, the pinion being rotatable secured to the armrest main portion and meshing with a rack secured to the armrest extension.

8. The armrest of claim 7, wherein the transmission mechanism between the pivotable attachment and the first pinion comprises:

a transmission belt configured to transmit rotation movement of a first pulley of the pivotable attachment to a second pulley of the first pinion; or a transmission chain configured to transmit rotation movement of the first pinion to a second pinion of the pivotable attachment.

9. The armrest of claim 8, wherein a diameter of the first pulley is adjusted based on a rotation angle of the armrest between the folded position and an in-use position.

10. The armrest of claim 1, further comprising a spring pre-loaded mechanism configured to bring the armrest to its folded position when activated.

11. The armrest of claim 10, wherein the spring pre-loaded mechanism is configured to be activated by a small push on the armrest.

12. The armrest of claim 10, wherein the spring pre-loaded mechanism comprises:

a torsional spring pre-loaded mechanism at the pivotable attachment.

13. The armrest of claim 1, wherein the pivotable attachment is configured to adjust an angle of the armrest in an in-use position with respect to the horizontal direction.

14. A vehicle seat comprising the seat backrest and the armrest of claim 1.

15. A vehicle comprising the vehicle seat of claim 14.

\* \* \* \* \*